Figure 1:
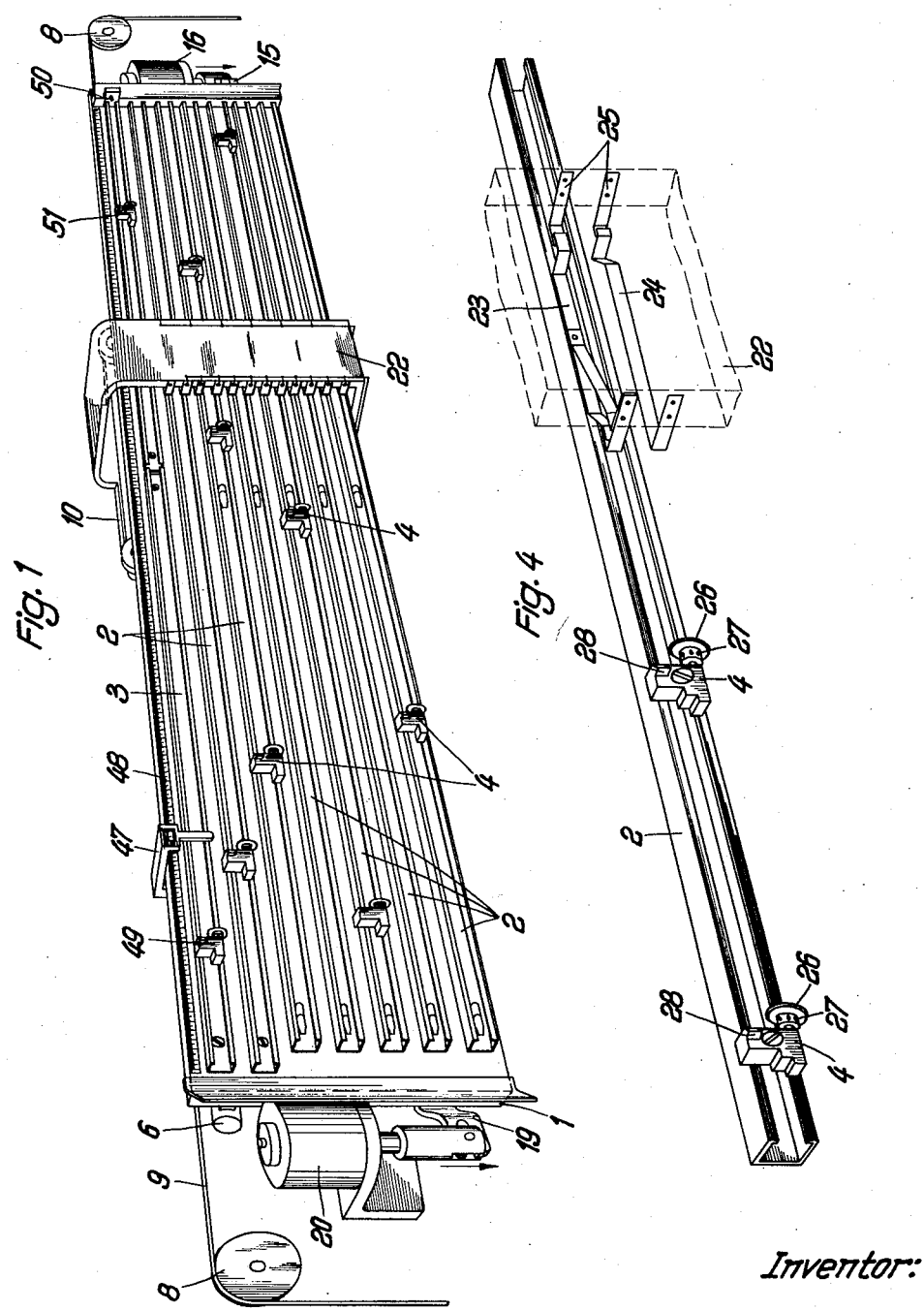

Inventors:
SIEGFRIED PAUL + ARTUR GUSE
By Burgess, Dinklage + Sprung
ATTORNEYS

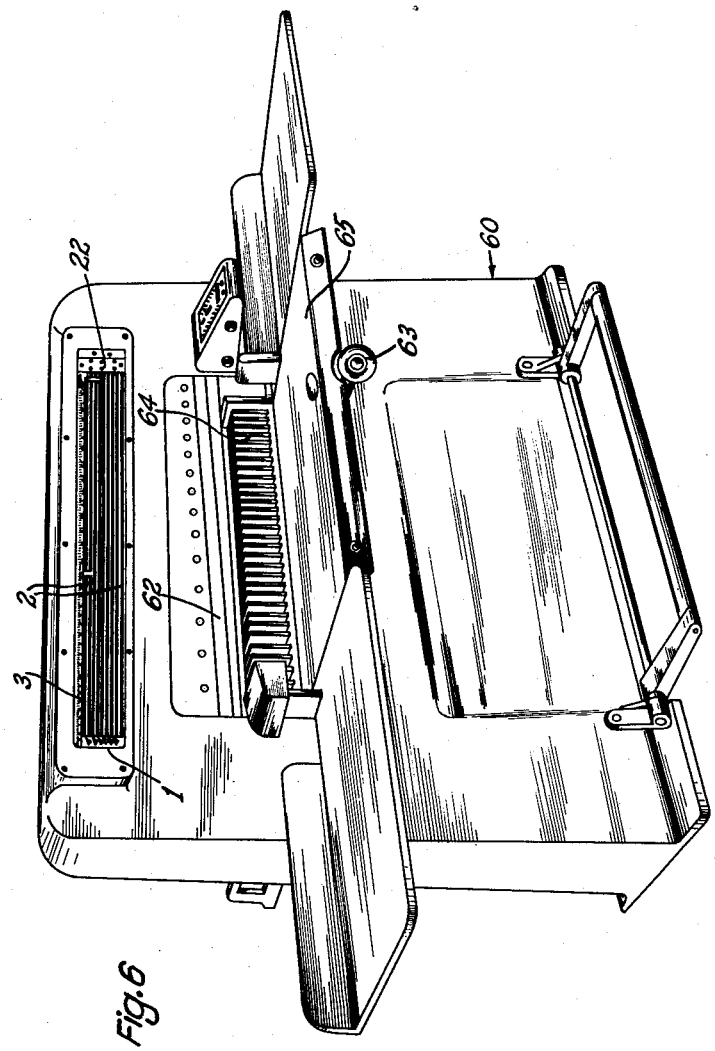

United States Patent Office 3,061,764
Patented Oct. 30, 1962

3,061,764
DEVICE FOR CONTROLLING THE FEED-SADDLE OF CUTTING-MACHINES FOR PAPER, CARDBOARD AND SIMILAR SUBSTANCES
Siegfried Paul, Hannover-Friedenau, and Artur Guse, Hannover, Germany, assignors to H. Wohlenberg Kommanditgesellschaft, Hannover, Germany, a corporation of Germany
Filed Apr. 17, 1957, Ser. No. 653,324
Claims priority, application Germany Apr. 18, 1956
12 Claims. (Cl. 317—123)

The present invention concerns machines for cutting paper, cardboard and similar sheet material of the kind having a feed saddle back gauge and cutting equipment, the movements of which have to be controlled to suit various circumstances of work, viz. repetition work, pre-planned cutting of a desired sequence, repeating or alternating et cetera, and the invention is particularly concerned with a device for controlling such machine. An important object of the invention is to provide a means whereby the connections for the back gauge drive can be switched over without inertia, so that dimensions can be accurately maintained in the operation of the machine which up to the present has been controlled by means of end or limit switches depending solely on the path of travel. The saddle is the basic machine part to be controlled herein. It is a massive element with much inertia. The saddle or back-gauge feeds the stack of sheets under the knife, between cutting strokes, to precise positions.

A further object is to provide a means whereby burning of contacts is avoided, and transition resistances of a few kilohms at the contacts have no effect on the accuracy or freedom of inertia of the switching operations.

The invention consists of a cutting machine in which the feed saddle is controlled by electric switchgear connected to and driven synchronously with the saddle, characterised in that the switchgear is mounted on a carriage and the switching action is obtained by means of switch cams adjustably mounted on bars along the path of travel of the carriage to co-operate with the switchgear to open or close circuits of electro magnetic controls of couplings for the saddle drive and also the drive of the cutting equipment, the impulses for operating said controls being produced by current flowing through electronic valves which are normally biased to limit the current and prevent operation, the co-operation between the switchgear contacts and cams causing current to flow in the valve circuits and operate the controls.

Conveniently, two electronic valves are provided, the electrode or a control grid of each normally being at a bias potential such that no current flows, i.e. the valves are wattlessly connected, the co-operation between a contact and a stop cam "grounding" the grid whereby the bias potential is removed.

Conveniently, the arrangement is such that a function of one valve is to slow down the feed carriage, which owing to its inertia will still move, but will decelerate, whilst a function of the second valve is to stop the feed carriage. In this way, by a correct spatial relation of the contacts operating the valves, the feed carriage can be made to lose its kinetic energy sufficiently to be arrested immediately on the operation of the second valve.

By suitable selective operation, due to the position of the stop, cams and the bars in use, and by the use of hand operated setting switches various operations can be performed, viz. fully automatic or semi-automatic operation can be obtained.

Means are also provided in accordance with the invention, for driving the switchgear carriage by means which can be interrupted easily to allow the saddle to move independently thereof.

In order that a clear understanding of the invention may be obtained, reference will now be made to the accompanying drawings showing by way of example, a preferred control device in accordance with the invention.

Figure 2:
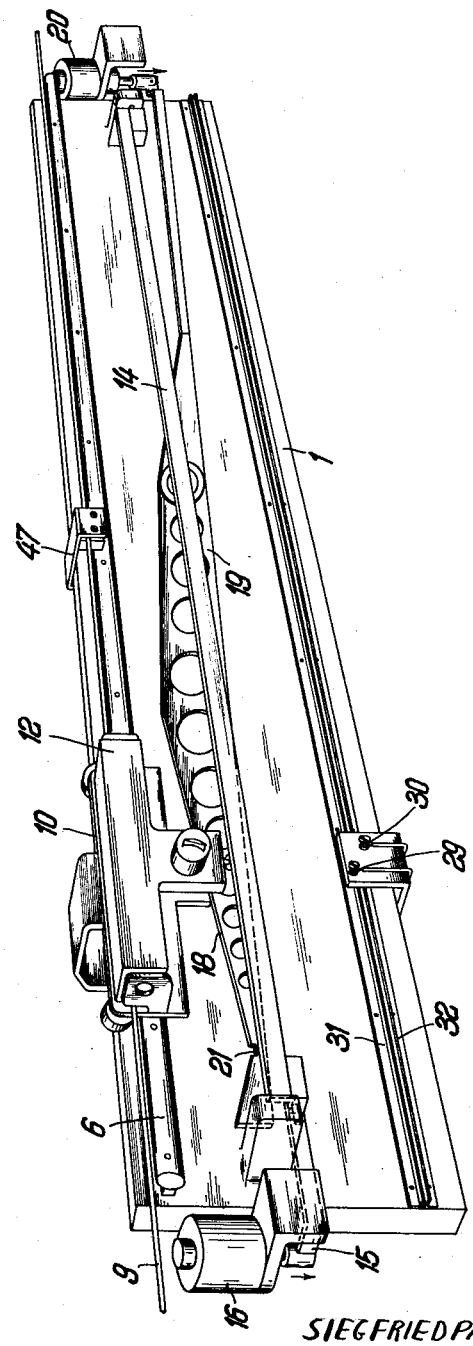
Figure 3:
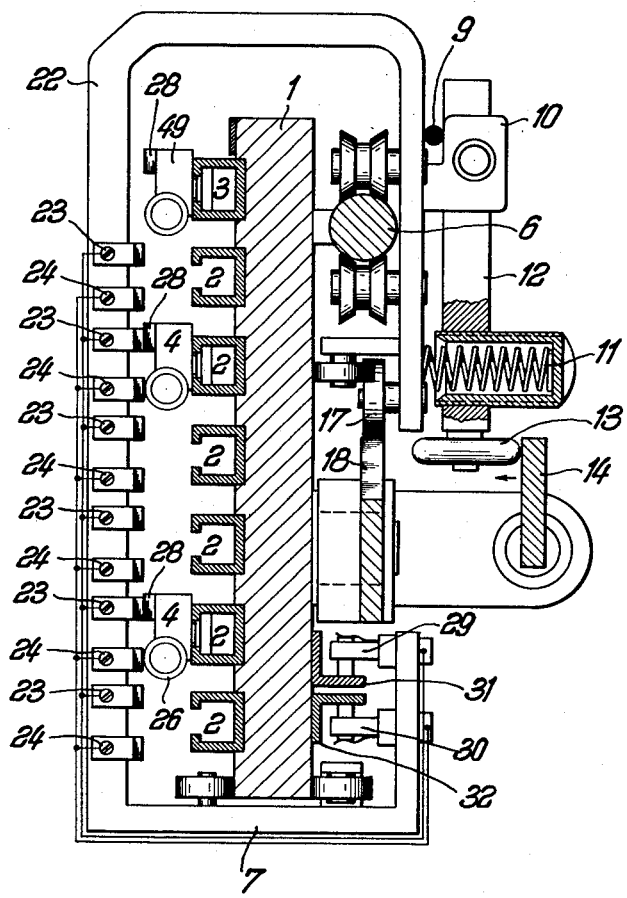
Figure 5:
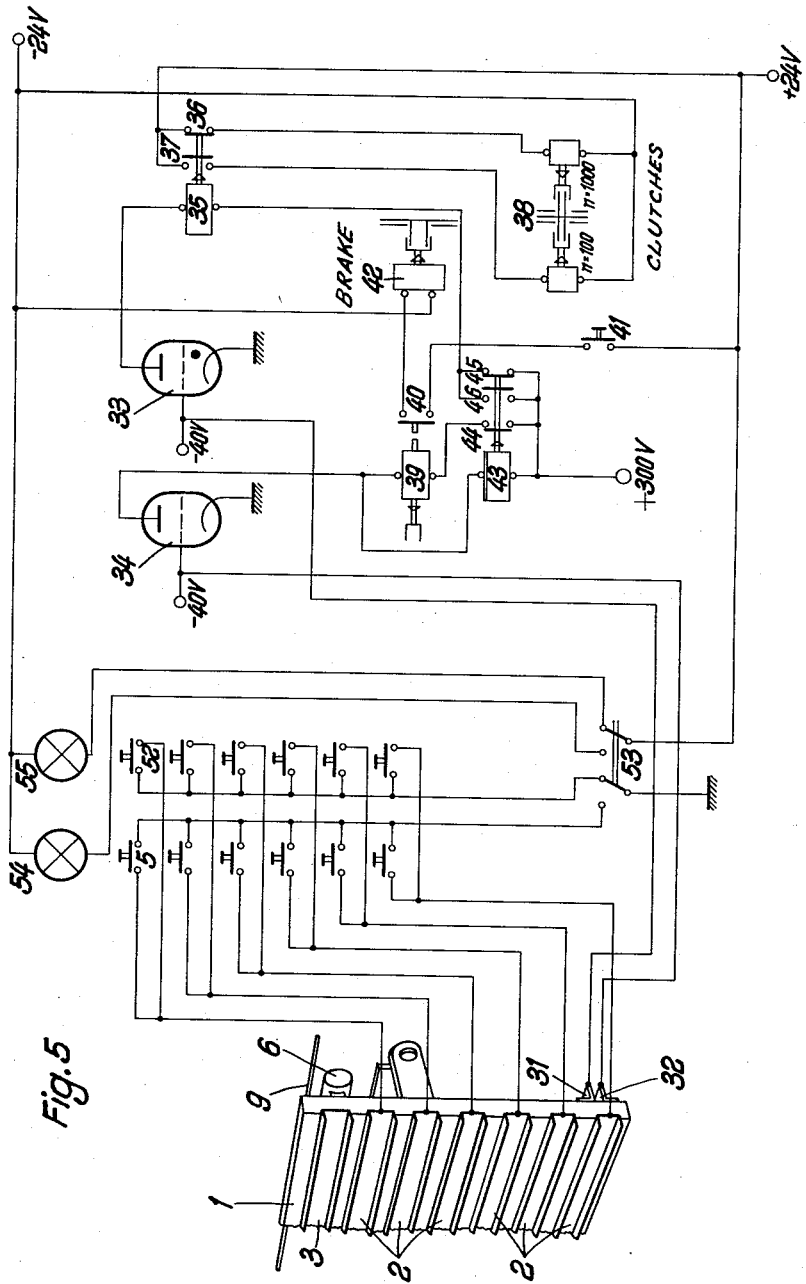

In the drawings:

FIGURE 1 is a view from the front, of the feed device of a cutting-machine, such cutting machines being known to the art, FIGURE 2 is a view of the feed-device from the rear, FIGURE 3 is a cross-sectional diagram of the connections, FIGURE 4 shows the arrangement and construction of the change over and stop contacts of the switchgear, and also the switching-cams attached to the contact bars, FIGURE 5 constitutes an actual diagram of connections for the feed-device, and FIGURE 6 is a view of a complete machine incorporating the invention.

At a point convenient for the operation of the machine 60, see FIGURE 6, e.g. above it, on the front wall, is situated the base-plate 1 of the feed-device, to which said base-plate the contact-bars 2 of which the minimum length corresponds to the total feed-travel of the saddle are attached above one another, and isolated from one another and in such a way as to be inter-changeable. The upper edge of the plate 1 carries a reversing-bar 3 for reversing the saddle-drive equipment from forward to backward motion. The bars 2 bear switch-cams 4 at a suitable distance from the feeds to be used in the cutting operation. The contact-bars 2 are each electrically connected with a selector switch 5 of a bank of switches and can be grounded by closing the associated selector switch.

The rear part of the base-plate 1 carries a rail 6 for guiding the switching-device, which is constructed bridgewise in the form of a switch carriage 7. The switch carriage 7 (see FIGURE 3) can be connected by means of the clamp coupling 10 to a pull-cable 9, this latter being guided over a pulley 8, and which, within the zone of base plate 1 runs parallel to this latter, and the ends of which are attached to the feed-saddle 64. The cable clamping parts 10—11—12—13, effect, in non-operating condition, the coupling of the roller switch 7 to the cable 9. The clamp-lever 12 is turnably supported in bearing 10 through the pin therethrough so that said lever, through the power of the compression spring 11, clamps cable 9 with its upper lever-arm against the roller switch 7. In this position, the cable 9 carries along the roller switch 7. When the cable is coupled to the switch-carriage, said carriage moves along the base-plate 1 synchronously with the movement of the saddle. The clamping by the coupling 10 is obtained by means of a pressure spring 11. The coupling can be released against the spring action by a pressure roller 13, which is mounted on the movable part 12 of the coupling 10, and by a swivel bar 14, of which the switch lever 15 is acted on by a lifting magnet 16, so that the pull cable 9 can move along freely without taking the switch-carriage 7 with it. In order to repeat identical feed paths the switch-carriage 7 is allowed to return to its zero position, which in the constructional example illustrated, is situated at the right hand end of the base-plate 1, this being effected by a return roller 17 on the rigid part of the clamp coupling 10.

Upon disengagement of the cable-clamping, whereby the push-magnet 16, thru the lever 15, has pressed the bar 14 against the roller 13, and thereby has lifted up the upper part of the clamping-lever 12, said lever being turnable in the bearings 10 with the pin, from the cable, against the power of spring 11, the switch-carrying carriage 7 is freely slidable. The pull-magnet 20 pulls the return-mechanism lever 19, which is turnably supported at its right lever-arm, so that its left arm is being pressed up. Thereby, the return-mechanism roller 17, together with the roller carriage switch 7, rolls on the curve 18 of the return-mechanism lever 19 to the left and comes into inactive position in the notch 21 of the return-mechanism lever 19. This position of the carriage is the zero-position, in which, thru de-energizing of the magnets 16 and 21, the cable-couplings 10 to 15 are being closed, and the return-mechanism power ceases. The torque which occurs causes this return roller to move over the curved arm 18 of the return lever 19, which is attached by a pivot to the rear of the base-plate, as soon as the magnet 20, acting on the opposite end of the lever, causes the curved part 18 to act on the return roller 17. In the neutral (zero) position the switch-carriage 7 is held by means of a recess 21 in the curved part 18 of the return lever 19, into which the return roller 17 comes to rest.

The arrangement described in the foregoing, however, and consisting of parts 13, 14 and 16–21, only serves to convey the switch-carriage back to its zero position in the case of repeat feed operation in which the switch-carriage 7 moves to and fro between two adjusted switch cams 4 and the zero position notch 21. In this case the switching of the magnets 16 and 20 is effected by two cams or other switches situated on the constant-speed shaft of the machine and via electrical or mechanical transmission members not shown in the drawing and well known per se.

On that side of its bridge-web 22 facing the contact bars 2, the switch-carriage 7 carries, for each contact-bar 2 two contacts, viz. a resilient slow-to-stop or switch-over contact 23 which may, for example, be 30 mm. long, and which takes the form of a sliding contact, and a resilient stop-contact 24, all of which contacts are isolated and are resiliently attached to the bridge-web 22 so that the spring pressure is applied against the contact bars 2. The path provided for the elasticity of the contacts 23 and 24 is limited in the direction of the contact bars 2 by limiting or stop elements 25, which are affixed to the bridge-web 22. The position of the stop-contacts 24 is staggered in relation to that of the switch over contacts 23 on the bridge-web 22, so that said contacts 24 touch the counter-contacts 26 (situated in their path) of the switch-cams 4 when the switch-over contacts 23 have just left their counter-contacts 28 on the switch-cam 4 (see FIGURE 4). The counter contacts take the form of graduated adjustable contacts each via a screw 27. The described construction and arrangement of the switch-over contacts 23 with the tongue of their long sliding contact thus moving in advance of the stop-contact 24 ensures that the contact bars 2, after contact is made immediately re-transmit their action, via one of the switch-cams 4 situated on them, to further switch cams in the vicinity of those whose action is thus picked up, in other words, that in the case of saddle-feed operations below the length of the switch-over contacts 23 the saddle drive remains adjusted to the lower rate of revolution and no rapid advance motion takes place. Bar 2, which is grounded by switch 5, respectively switch 52, is equipped with contact-cams 4 in those places where the roller-switch 7, with its contacts 24 springly mounted on the bridge-bar 22, should effect a stop of the saddle 64 of the papercutting machine to be controlled. For precision adjustment of the exact stopping point, the operative opposite contacts 26 of the contact cams 4 are designed as micrometer screws, the thread-axles of which are running in the direction of the roller-switch 7.

The group of switch-over contacts 23 and the group of stop-contacts 24 are electrically connected together in each case and are also connected in groups with sliding contacts 29 and 30, which are on the rear part of the base plate 1, and slide against the guide bars 31 or 32 as the case may be, which face them. The bars 31 and 32, moreover, are each connected each to the control grid of an electronic valve (33 and 34 respectively), which function as two electronic switches. As shown, the guide bar 31 of the switch-over contact 23 is connected with the valve 33 and the guide-bar 32 of the stop-contacts 24 with the valve 34.

In the anode-circuit of the electronic valve 33 is the switch-over relay 35, by which the saddle-speed by means of the contacts 36 and 37, is switched down from rapid advance to slow advance, that is to say, the change over is effected by a change-speed coupling 38 situated between a reduction gearing with two final rates of revolution. The saddle is brought to a stop by the fact that the stop-contacts 24 operate the brake release magnet 39 via the electronic valve 34 in its anode-circuit, the said magnet stopping the saddle-feed with a sudden action of the brake, after the disconnection of the saddle drive spindle. In this connection, when the switch 41 is set to "fully automatic cut and feed," the switch 40, which is affixed to and is actuated by the brake release magnet 39, causes the coupling 42 for the cutter drive to engage, so that the cutting action takes place immediately after the saddle stops. If the switch 41 has not been turned to the position for automatic operation, and the machine is to be engaged by hand, then the coupling 42 for the cutter-drive is caused to engage indirectly, via the switch 40 in well known manner.

The valve 33 which alters the saddle-drive from rapid to slow motion, is a thyratron and once this thyratron has been struck, it remains ignited until the valve 34, for which a power valve is employed, operates through one of the stop-contacts 24. This by operating the brake release magnet 39, causes the brake for the saddle-drive to fall into position and also (with a slight delay) operates the relay 43. This cuts off current through the magnet 39 and the current through thyratron 33 is temporarily interrupted, through the relay contacts 44 and 45, so that the thyratron is extinguished and the rapid advance motion of the saddle can again be started up via the relay 35 and by means of the contact 36, unless the switch-over contact 23 which picks up the action in advance, already transmits contact once more through the next switch-cam 4. In this case, the thyratron 33 is immediately re-ignited and the slow motion of the saddle-drive is switched on via the contact 37 and the relay 35.

The represented machine 60 which is shown in FIGURE 6 as an example of the assembly of the invention, is a single-knife paper cutting machine, having, by means of a motor-driven spindle 63, the saddle 64, which is fastened to the spindle nut, pushing the paper stack (not sketched) on the table 65, ahead of the saddle, so far under the knife 62 that the paper stack which, after the cutting operation, is lying in front of the knife, has the desired width. The saddle 64 is often also termed a back-gauge. Object of the invention is, therefore, the control of the spindle-operated saddle 64 by means of the novel, very exact operating feeding control device, which permits saddle-feeding of various lengths according to the program, and, in addition, also permits saddle-feeds of the same length, as repeat-cuttings, and operates with pure digital impulse emission.

For planned cutting, the arrangement in accordance with the invention is as follows:

After the switch-cams 4 have been attached to one of the contact-bars 2 at distances corresponding to the desired cutting-width, the contact-bars (if the stop-cams 4 are inserted outside the machine) are clamped to the base-plate 1, for which purpose suitable clamps or snaps are provided, and are grounded by means of selector switches 5. The saddle is situated on the rear table in its correct position in accordance with the size to be cut. On the operator's side of the machine, one of the three selector keys there provided (for "planned," "repeating" or "alternating feed") is operated. If, for example, the key for "planned" cutting is depressed, i.e. if feeds of different magnitudes are to be operated in succession, then the other two keys and thus the control devices which they operate, are automatically put out of operation, via suitably interrelated relays. This pre-selector equipment in itself is already known in other spheres of industry, e.g. in machine tool making, so that a detailed or illustrated description can be dispensed with.

In addition to one of these three selector keys for the type of feed required, the push button 41 must also be used to set the machine to semi-automatic or fully automatic operation as desired. The saddle-drive is then switched to "advance." Simultaneously with the advance of the saddle, the switch-carriage 7 also commences to leave its initial position and to move rapidly along the base plate 1. Now, if the switch-over contact 23 allocated to the selected bar 2 touches the corresponding counter-contact 28 of the first switch-cam 4, then since the contact-bar 2 employed is grounded via the selector switch 5, the hitherto negatively biased grid of the valve 33 is earthed, causing it to ignite and operate the switch-over relay 35, thereby to switch the change speed coupling 38 of the saddle-drive from rapid to slow advance. As the change in the rate of revolution of the spindle rotating at a relatively high speed takes place suddenly while the masses in motion temporarily act in opposition to this process until they come into line with the lower rate of revolution, in practice the feed-saddle undergoes a fall in speed or deceleration which takes a sinusoidal course. The switch-over contact 23 will already have travelled enough of its actual length to leave the counter contact on the switch-cam 4 shortly after reaching the lower saddle speed, so that the stop-contact 24 can come into operation. This ensures that the control grid (likewise at negative potential) of the electronic valve 34 is earthed, so that current flows and acts via the brake release magnet 39 on the brake for the driving spindle, causing this brake to drop suddenly into position. With this process, and with a slight retardation, the relay 43 is likewise attracted, and with its closed circuit (rest) contact 44 it opens the circuit to the brake release magnet 39 and at the same time (through the relay contact 45) opens the anode circuit of the electronic valve 33, whereby this latter is extinguished, the circuit being once more closed via the contact 46. The switch 40, which is operated by the brake release magnet 39, comes into operation for fully automatic work when the switch 41 is in the appropriate position, and switches on the cutter drive via the coupling 42, so that the cutting action takes place. As soon as the cutter has moved upwards and away from the material being cut, the saddle feed is again switched on, and the processes described are repeated, until the entire "feed program" has been completed.

After the last cut, an indicator needle 47, which is attached to a pull-cable 9 and which moves over a graduated saddle position indicating scale 48, touches a return contact 49, which is adjustably positioned on the reversing bar 3. This operation switches the saddle drive to "rapid return," and throughout the duration of the return movement all the switch cams 4 are put out of operation, since the lead to earth is interrupted. The feed saddle moves back, now taking with it the switch carriage 7 which is clamped on to the pull cord device 9, the indicator needle 47 now making contact with the advance motion contact 51, and thus switching over (via a relay not shown in the drawing) to "forward movement" of the saddle. At the same time, the switch cams 4 again come into operation by the earthing of the bars 2 so that the saddle runs slowly and then comes to a stop as previously described. The switching of the relay through the contact 51 results also in the opening of a contact to the main coupling 42, so that in this case no automatic cut is possible, and after the insertion of the fresh material to be cut, the first cut and thus the commencement of the "automatic cutting" program has to be switched on by hand. The first switch-cam 4 on the bar 2 thus determines the "reference cut position" (of the feed saddle) required for the set program.

As already mentioned, the feed arrangement described also allows for the repetition of identical feed travels, in which the switch carriage 7 with its switch over contacts and stop contacts 23, 24, moves to and fro between a previously adjusted stop-cam 4 and the neutral or zero position in the notch 21 in the curved part 18.

With this type of feed operation, the feed equipment in accordance with the invention functions as follows:

After the pre-selector key has been operated for repeated feed, and after the saddle has been switched to return motion, the switch carriage 7 returns as described to its initial position, moving at rapid speed and synchronously with the saddle. As soon as the indicator needle 47 touches the return motion contact 49, the saddle drive is switched over from rapid return to rapid advance and from rapid advance to slow advance, whilst at the same time the reversing bar 3 is in co-operation with the valve 34 so that resultant contact between needle 49 and advance motion contact 51 brings the saddle drive to a stop via brake release magnet 39. During this operation, all the switch cams 4 on bars 2 are ineffective. As soon as the machine is switched on for the first cutting action, the so called squaring cut, and the cutter has moved upwards and away from the stack of material, the circuits to magnets 16, 20 is closed via cam switches on the machine's constant speed shaft. Clamp 10 opens against the spring 11 and the switch carriage 7 is drawn by the action of lever 19 into exact zero position for repeat feed, this position being marked by notch 21 on return cam 18. Immediately, both magnets 16 and 20 drop again to cause engagement of clamp coupling 10 with pull cable 9 and the automatic saddle feed operation can recommence. The switch carriage 7 is now taken along the base plate until by contact with a switch cam 4, the saddle drive stops as previously described via contacts 23, 24. After the subsequent cut, which can be effected either indirectly, by hand, or automatically via switch 40, after switch 41 has been operated, the switch carriage 7 is drawn back to the zero position (notch 21) by means of return motion apparatus 13, 14, 15–20.

The process is repeated until the saddle after final cutting operation has automatically returned owing to contact of indicator 47 with the return motion contact 49 to the squaring cut position marked by the adjustable advance motion contact 51.

When the saddle moves back after the automatic repeat cutting, the switch carriage 7 moves to a greater or lesser distance away from the indicator 47, and thus (in the position in which it is clamped to the cable) moves against the switch 50. This causes, via a relay, the switching in of magnet 16, and thus the uncoupling of switch carriage 7 from the cable 9, preventing the cable from being forced to slip in the clamp coupling.

The installation of a second selector switch 52 also makes it possible in the case of repeat feed operations, to alternate between any desired contact bars 2, i.e. to feed a second size through in constant alternation with the first size fed through. This is achieved in that by contacts 53 of an alternating relay, which said contacts are controlled by a cam switch likewise situated on the constant speed shaft, the two selected contact bars are earthed in alternation, so that they come into operation alternatively for the control of the saddle feed. A push button switch, situated parallel with the cam switch controlling the contacts 53 of the alternating-relay, enables this latter also to be reversed by hand.

In accordance with a feature of the invention, the selector switches 5 and 52 are fitted with signal lamps 54, 55, which come on whenever the corresponding selector switch, 5 or 52, comes into operation owing to the position of the contact 53 of the alternating relay, and which thus indicate which of the selected contact bars 2 is to determine the subsequent cutting width.

We claim:
1. Apparatus for programming the operation of a feed device in a paper cutting machine comprising a plurality of bars, a carriage movable in synchronism with the feed device and adjacent said bars, a contactor for each of said bars extending from said carriage, switch cams positionable along each bar in accordance with the desired slow-stop and start program for the feed device to be effected thereby, circuit means for selecting a program bar for control action, and control means in circuit with said circuit means and the contactors for operating said feed device in accordance with the selected program through successive contacting of the switch cams along the selected bar with the associated contactor.

2. Apparatus as claimed in claim 1, further including a cable movable with the feed device, a clamp for coupling said carriage to the cable, and electromagnetic means for releasing said clamp coupling.

3. Apparatus for programming the operation of a feed device in a paper cutting machine comprising a plurality of interchangeable bars in a parallel array, a carriage movable in synchronism with the feed device and adjacent said bars, a contactor pair for each of said bars extending from said carriage, switch cams positionable along each bar in accordance with the desired slow-stop and start program for the feed device to be effected thereby, circuit means for selecting a program bar for control action, and control means in circuit with said circuit means and the contactor pairs for operating said feed device in accordance with the selected program through successive contacting of the switch cams along the selected bar with the associated contactor pair.

4. Apparatus as claimed in claim 3, in which one of each contactor pair is proportioned to maintain its connection with a switch cam to establish a corresponding period of slowing of the feed device.

5. Apparatus as claimed in claim 3, in which said circuit means comprises two groups of selector switches in connection with said bars, a change-over switch for connecting either group of the selector switches to the control means, whereby selected bars are connectable alternately through the change-over switch.

6. Apparatus for programming the operation of a feed device in a paper cutting machine comprising a plurality of conductive bars in a parallel array, a plane member carrying said bars, a carriage movable in synchronism with the feed device and adjacent said bars, a contactor pair for each of said bars extending from said carriage, switch cams positionable along each bar in accordance with the desired slow-stop and start program for the feed device to be effected thereby, circuit means for selecting a program bar for control action, and control means in circuit with said circuit means and the contactor pairs for operating said feed device in accordance with the selected program through successive contacting of the switch cams along the selected bar with the associated contactor pair.

7. Apparatus as claimed in claim 6, in which one of each contactor pair is proportioned to maintain its connection with a switch cam to establish a corresponding period of slowing of the feed device and the other of each contactor pair being positioned with respect to its associated one contactor to effect the stopping of the feed device after its slowing cycle.

8. Apparatus as claimed in claim 6, in which said circuit means comprises two groups of selector switches in connection with said bars, a change-over switch for connecting either group of the selector switches to the control means, whereby selected bars are connectable alternately through the change-over switch.

9. Apparatus for programming the operation of a feed device in a paper cutting machine comprising a plurality of interchangeable conductive bars in a parallel array, a plane member carrying said bars, a carriage movable in synchronism with the feed device and adjacent said bars, a rail mounted on said member for said carriage, a contactor pair for each of said bars extending from said carriage, switch cams positionable along each bar in accordance with the desired slow-stop and start program for the feed device to be effected thereby, circuit means for selecting a program bar for control action, and control means in circuit with said circuit means and the contactor pairs for operating said feed device in accordance with the selected program through successive contacting of the switch cams along the selected bar with the associated contactor pair.

10. Apparatus as claimed in claim 9, in which one of each contactor pair is proportioned to maintain its connection with a switch cam to establish a corresponding period of slowing of the feed device and the other of each contactor pair being positioned with respect to its associated one contactor to effect the stopping of the feed device after its slowing cycle.

11. Apparatus as claimed in claim 9, further including a cable movable with the feed device, a clamp for coupling said carriage to the cable, and electromagnetic means for releasing said clamp coupling.

12. Apparatus as claimed in claim 9, in which said circuit means comprises two groups of selector switches in connection with said bars, a change-over switch for connecting either group of the selector switches to the control means, whereby selected bars are connectable alternately through the change-over switch, and signal lamps in circuit with said selector switch groups arranged to indicate the sequence of program bar selection.

References Cited in the file of this patent

UNITED STATES PATENTS

| | | |
|---|---|---|
| 1,903,069 | Ross | Mar. 28, 1933 |
| 2,440,906 | Metzger | May 4, 1948 |
| 2,562,950 | Roessl | Aug. 7, 1951 |
| 2,649,155 | Spiller | Aug. 18, 1953 |
| 2,737,158 | Seybold | Mar. 6, 1956 |

FOREIGN PATENTS

| | | |
|---|---|---|
| 691,083 | Great Britain | May 6, 1953 |